United States Patent
Shima et al.

(10) Patent No.: US 10,495,788 B2
(45) Date of Patent: Dec. 3, 2019

(54) RESIN MOLDED PRODUCT, INTERCHANGEABLE LENS FOR CAMERA, AND METHOD OF MANUFACTURING RESIN MOLDED PRODUCT

(71) Applicant: CANON KABUSHIKI KAISHA, Tokyo (JP)

(72) Inventors: Tomohiro Shima, Yokohama (JP); Kei Oikawa, Kawasaki (JP); Yusuke Iwaki, Yokohama (JP); Koki Kodaira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 15/583,218

(22) Filed: May 1, 2017

(65) Prior Publication Data

US 2017/0336535 A1    Nov. 23, 2017

(30) Foreign Application Priority Data

May 17, 2016  (JP) .................................. 2016-098988
Apr. 12, 2017  (JP) .................................. 2017-079189

(51) Int. Cl.
| | | |
|---|---|---|
| *G02B 1/04* | (2006.01) | |
| *B29C 45/00* | (2006.01) | |
| *B29C 45/37* | (2006.01) | |
| *B29D 11/00* | (2006.01) | |
| *G02B 7/14* | (2006.01) | |
| *B29K 69/00* | (2006.01) | |
| *B29K 105/16* | (2006.01) | |
| *B29K 509/08* | (2006.01) | |
| *B29K 105/12* | (2006.01) | |

(52) U.S. Cl.
CPC .......... *G02B 1/041* (2013.01); *B29C 45/0005* (2013.01); *B29C 45/0013* (2013.01); *B29C 45/37* (2013.01); *B29C 45/372* (2013.01); *B29D 11/00009* (2013.01); *G02B 7/14* (2013.01); *B29K 2069/00* (2013.01); *B29K 2105/122* (2013.01); *B29K 2105/16* (2013.01); *B29K 2509/08* (2013.01); *B29K 2995/0022* (2013.01); *Y10T 428/1352* (2015.01)

(58) Field of Classification Search
CPC ...... G02B 1/041; G02B 7/14; B29C 45/0005; B29C 45/372; B29C 45/0013; B29C 45/37; B29D 11/00009; B29K 2105/122; B29K 2995/0022; B29K 2509/08; B29K 2105/16

See application file for complete search history.

(56) References Cited

U.S. PATENT DOCUMENTS

| | | |
|---|---|---|
| 7,048,428 B2 | 5/2006 | Tahara |
| 2006/0001975 A1 | 1/2006 | Miyata |
| 2012/0028000 A1 | 2/2012 | Sasaki et al. |

FOREIGN PATENT DOCUMENTS

| | | |
|---|---|---|
| CN | 1232979 A | 10/1999 |
| CN | 102362247 A | 2/2012 |
| CN | 104023912 A | 9/2014 |
| JP | 2001-323089 A | 11/2001 |

(Continued)

*Primary Examiner* — James C Yager
(74) *Attorney, Agent, or Firm* — Canon U.S.A. Inc., IP Division (57) ABSTRACT

A filler-containing resin molded product with a surface which includes irregularities which are transferred from a mold cavity to the surface and have an arithmetic mean roughness of 0.8 μm or greater and 10 μm or less and a peak arithmetic mean curvature of 400 [1/mm] or greater and 900 [1/mm] or less.

15 Claims, 6 Drawing Sheets

(56) References Cited

FOREIGN PATENT DOCUMENTS

| JP | 2005-068241 A | 3/2005 |
| JP | 3630950 B2 | 3/2005 |
| WO | 2010/011843 A1 | 1/2010 |

FIG. 10

RESIN MOLDED PRODUCT, INTERCHANGEABLE LENS FOR CAMERA, AND METHOD OF MANUFACTURING RESIN MOLDED PRODUCT

BACKGROUND OF THE INVENTION

Field of the Invention

The present disclosure generally relates to resin molded products and a filler-containing resin molded product used as, for example, a lens barrel of an optical device, such as a camera.

Description of the Related Art

A need exists for smaller, lighter-weight camera exterior parts, such as a lens barrel. This need has promoted many of these parts to shift from metal parts to resin molded products. Materials to be molded contain a filler, such as a glass filler, to increase strength. After injection molding, these resin molded products are subjected to a coating process of applying a coating material, such as an organic solvent, so that the products have an intended good appearance.

However, a mold used for molding resin containing a filler, such as a glass filler, typically has a surface polished to some extent, such that the mold surface does not affect the appearance of a resin molded product to be coated. The filler may appear on the surface of the resin molded product. Furthermore, a mechanical delay in resin flow for injection molding tends to occur in a recess or a welded joint of the mold. In such a portion, the resin flow may become turbulent flow, causing fibers of the filler to be oriented in various directions. Unfortunately, the filler fibers may partly project from the surface of a resin molded product. If coating is applied to the molded product with the filler fibers projecting from the surface, the filler fibers may project from the coated surface ("filler floating"), resulting in poor appearance.

As disclosed in Japanese Patent Laid-Open No. 2001-323089, mold texturing and injection molding are performed so that a textured surface of a resin molded product to be subjected to coating has an arithmetic mean roughness Ra1 from 0.5 to 10 µm and a maximum height Ry1 from 1 to 100 µm. The textured surface of the resin molded product is covered with a coating so that the coating has a surface roughness defined by an arithmetic mean roughness Ra2 of 2 µm or less and a maximum height Ry2 of 10 µm or less, thus reducing or eliminating an appearance defect, for example, a filler fiber exposed at the surface of the product. An insufficient arithmetic mean roughness Ra1 indicates substantially flat and smooth surface conditions, failing to prevent a filler fiber from projecting from the surface. A maximum height Ry1 greater than 100 µm indicates that the texture is too deep. Under these conditions, it is difficult to obtain a good appearance with a single coating and poor mold release is caused.

If a poor appearance accompanied by filler floating is overcome by controlling the roughness and height of each of the texture and the coating as described in Japanese Patent Laid-Open No. 2001-323089, the coating process is necessary. However, conditions such as appearance unevenness, for example, remain unsolved. Furthermore, the coating process accounts for a large portion of the manufacturing cost of parts. It is therefore difficult to reduce the production cost.

SUMMARY OF THE INVENTION

The present invention provides a resin molded product having a good appearance surface without coating while achieving a reduction in production cost. The resin molded product can be used as, for example, a lens barrel for an optical device, such as a camera.

An aspect of the present invention provides a resin molded product having a surface formed using a thermoplastic resin with irregularities transferred from a mold cavity to the surface. The irregularities have an arithmetic mean roughness of 0.8 µm or greater and 10 µm or less. The irregularities include peaks having an arithmetic mean curvature (hereinafter, "peak arithmetic mean curvature") of 400 [1/mm] or greater and 900 [1/mm] or less.

Further features of the present disclosure will become apparent from the following description of exemplary embodiments with reference to the attached drawings.

DESCRIPTION OF THE EMBODIMENTS

First Embodiment

Figure 1:
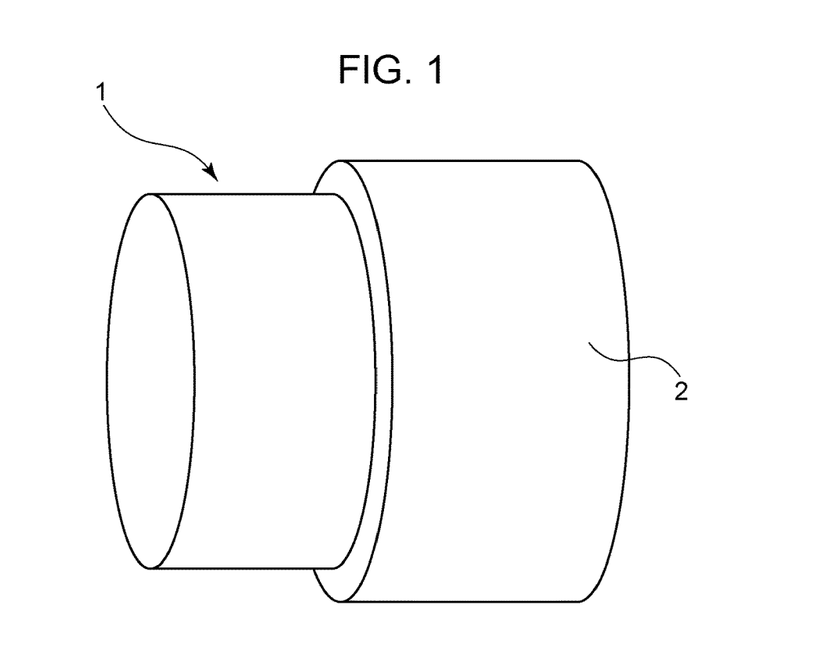
FIG. 1 is a schematic diagram illustrating an exemplary resin molded product according to a first embodiment.
Figure 2:
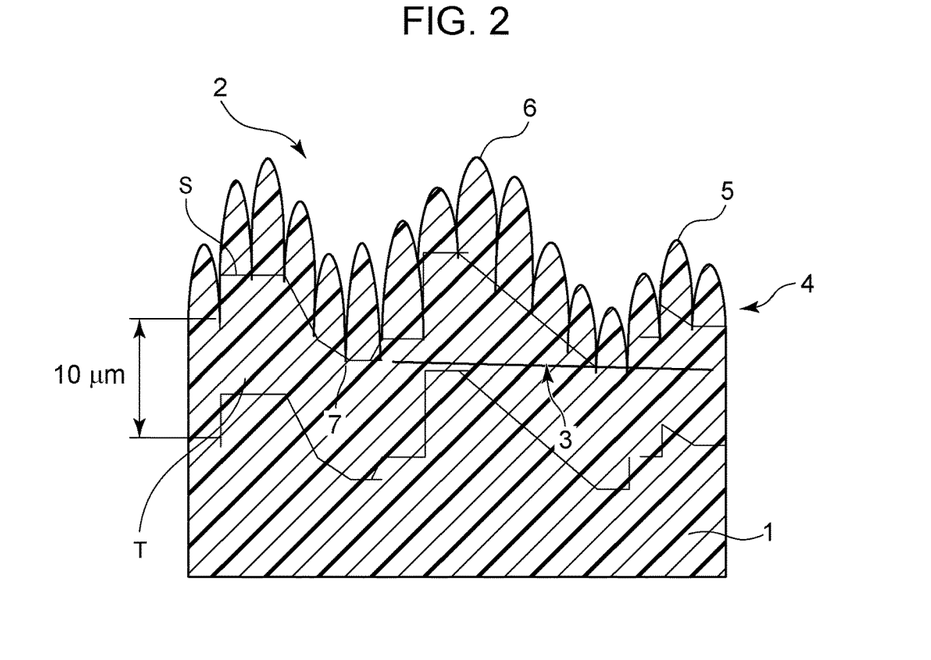
FIG. 2 is a sectional view of surface irregularities in an appearance surface of the resin molded product.

FIG. 1 is a schematic diagram of an exemplary resin molded product according to a first embodiment of the present disclosure and illustrates the resin molded product used as a lens barrel of an interchangeable lens for a camera. FIG. 2 is a sectional view of part of surface irregularities of an appearance surface 2 of the resin molded product, indicated at 1, illustrated in FIG. 1. The resin molded product 1 is made of filler-containing resin. FIGS. 1 and 2 illustrate the resin molded product 1 with the appearance surface 2. FIG. 2 further illustrates a reinforcing fiber (filler) 3, irregularities 4 in the appearance surface 2, ridges 6 as protrusions of the irregularities 4, and valleys 7 as recesses of the irregularities 4. The irregularities 4 will also be referred to as ripples 5 hereinafter. The valleys 7 are defined as part T extending 10 µm inwardly from a plane S (obtained by eliminating the ridges 6) connecting roots of the ridges 6 (or bottoms of the valleys 7). As illustrated in FIG. 2, the appearance surface 2 of the resin molded product 1 has the irregularities 4 and the irregularities 4 include the ridges 6 and the valleys 7. This arrangement prevents the filler 3 from entering the ridges 6, so that the filler 3 can be retained in the valleys 7. In other words, the proportion of fibers as the filler 3 (hereinafter, also referred to as "filler fibers 3") in the ridges 6 to a resin composition of the ridges 6 is much less than the proportion of the filler fibers 3 in the valleys 7 to the resin composition of the valleys 7. Specifically, the proportion of the filler fibers 3 in the ridges 6 is less than 10% of that in the valleys 7. Furthermore, the filler fibers 3 are distributed in a direction substantially parallel to the plane S connecting the roots of the ridges 6 (or the bottoms of the valleys 7). The term "filler" as used herein refers to a substance, such as reinforcing fiber, added to a thermoplastic resin in order to reinforce a molded product.

The irregularities 4 are so shaped that a two-dimensionally evaluated, arithmetic mean roughness Sa is 0.8 µm or greater and 10 µm or less and an arithmetic mean curvature Spc of peaks (or peak arithmetic mean curvature Spc) is 400 [1/mm] or greater and 900 [1/mm] or less. This shape enables the resin molded product 1 to have a good appearance without coating.

Figure 3:
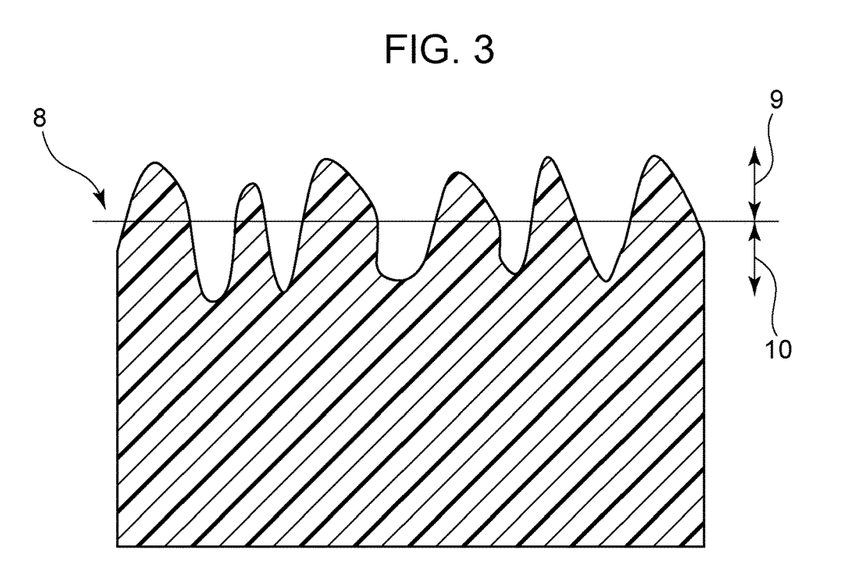
FIG. 3 is a sectional view of surface irregularities for explanation of an arithmetic mean roughness.

The arithmetic mean roughness Sa will now be described. FIG. 3 is a sectional view of irregularities in the surface of a molded product for explanation of the arithmetic mean roughness Sa. The arithmetic mean roughness Sa is given by Expression 1. The arithmetic mean roughness Sa is a parameter indicating the extension of an arithmetic mean roughness Ra evaluated on a line to a surface and is expressed in the unit µm in this case.

$$Sa = \frac{1}{A} \int\int_A |Z(x, y)| dx dy \quad (1)$$

where Z denotes a height component at x and y coordinates relative to an average level 8 (zero) of height components obtained in a measurement region having a sufficiently wide area and A denotes the area of the measurement region. In the present disclosure, the measurement region is 1000 µm×1000 µm in terms of surface roughness. The arithmetic mean roughness Sa is the mean of absolute values of height components 9 extending from the average level 8 in a protrusion direction and absolute values of height components 10 extending from the average level 8 in a recess direction in FIG. 3. In other words, the mean of height components of irregularities in the surface of a resin molded product is evaluated as a mean of the entire surface. The greater the value of the arithmetic mean roughness Sa, the greater the height components of the irregularities in the surface.

An arithmetic mean roughness Sa less than 0.8 µm indicates that the heights of irregularities in the surface of a resin molded product are very small and the filler fibers 3 are located very close to protrusions of the irregularities. The filler fibers 3 in the filler-containing resin molded product 1, according to the present disclosure, typically have a diameter from several micrometers to several tens of micrometers. When the arithmetic mean roughness Sa is small, the filler tends to be visually recognized, that is, the resin molded product tends to have a poor appearance.

In contrast, an arithmetic mean roughness Sa greater than 10.0 µm indicates that irregularities are too deep. Deep irregularities may cause poor mold release when a molded product is released from a mold, causing deformation of the irregularities or whitening due to abrasion of the surface of the molded product. It may be difficult to provide a molded product having a good appearance. Furthermore, if a necessary draft angle is increased and the shape of a molded product is restricted in dimensions or if high dimensional accuracy is required because of complexity in shape, it may be difficult to meet the restriction or the dimensional accuracy requirement.

For the above-described reason, although the filler 3 is less likely to be visually recognized as the arithmetic mean roughness Sa is greater, it is difficult to permit irregularities to have a height component greater than 10.0 µm. The inventors have found that the height components can range from 0.8 µm to 10.0 µm.

The inventors further have found that it is difficult to obtain the resin molded product 1 having a good appearance surface if the above-described requirement is met.

The filler fibers 3 located in the valleys close to the surface of the molded product tend to be oriented parallel to the surface of the molded product but are not completely parallel to the surface of the molded product. The filler fibers 3 may be oriented in various directions due to turbulent flow of resin. In such a case, the filler fibers 3 would partly project from the surface of a molded product and be visually recognized. The inventors have found that the arithmetic mean curvature, Spc, of peaks of the irregularities in the surface of the molded product has to be 400 [1/mm] or greater and 900 [1/mm] or less. The term "peak" as used herein refers to the top of each protrusion of the ripples 5.

Figure 4:
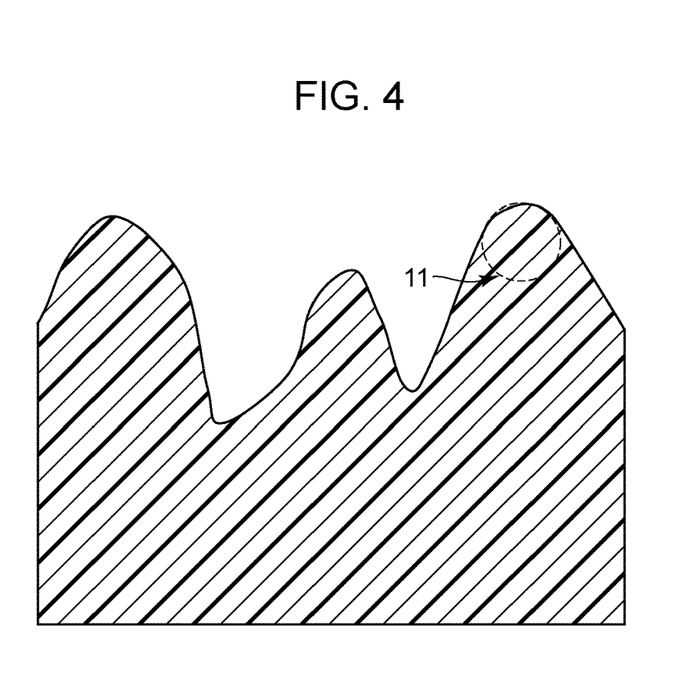
FIG. 4 is a sectional view of surface irregularities for explanation of an arithmetic mean curvature of peaks.

The peak arithmetic mean curvature Spc represents the mean of principal curvatures of the peaks in the surface. FIG. 4 is a sectional view of surface irregularities for explanation of the peak arithmetic mean curvature Spc. In the present disclosure, it is assumed that the measurement region is 1000 µm×1000 µm. The peak arithmetic mean curvature Spc is given by Expression 2.

$$Spc = -\frac{1}{2}\frac{1}{n}\sum_{k=1}^{a}\left(\frac{\partial^2 z(x, y)}{\partial x^2} + \frac{\partial^2 z(x, y)}{\partial y^2}\right) \quad (2)$$

where z denotes the height component at x and y coordinates and n denotes the number of peaks. The peak arithmetic mean curvature Spc therefore represents the mean of reciprocals of the radii of approximate circles 11 at the peaks of the surface irregularities in FIG. 4. A small peak arithmetic mean curvature Spc indicates that the ridges have a round peak having a wide width. A large peak arithmetic mean curvature Spc indicates that the ridges have a pointed peak having a narrow width.

A peak arithmetic mean curvature Spc greater than 900 [1/mm] indicates that the surface irregularities include acute-angled narrow protrusions. Such a shape tends to cause diffuse reflection of light impinged on the surface of the molded product, leading to a reduction in amount of light reflected to the eyes of a person looking at the molded product. The glossiness of the surface of the molded product would seem to be reduced or lost. The loss of the glossiness of the surface would facilitate visual recognition of appearance defects, such as color unevenness, transfer unevenness, a resin flow mark, and filler exposed at the surface (hereinafter, referred to as "filler floating"). Furthermore, the acute-angled, narrow shape of the protrusions of the surface irregularities would cause variations in resin flow conditions depending on how pressure is transmitted during molding, resulting in variations in transfer state. Protrusions would be likely to vary in shape. This would result in a change in light reflection state in the protrusions, such that appearance unevenness of the surface of the molded product would be easily visually recognized.

In contrast, a peak arithmetic mean curvature Spc less than 400 [1/mm] indicates that the surface irregularities will cause intense reflection of light that may, in turn, result in a significant change in appearance state visually observed. It is therefore difficult to reduce the peak arithmetic mean curvature Spc to a value less than 400 [1/mm].

For the arithmetic mean roughness Sa and the peak arithmetic mean curvature Spc, values determined for surface texture (surface roughness measurement) in accordance with ISO 25178 published by International Organization for Standardization are used. The arithmetic mean roughness Sa and the peak arithmetic mean curvature Spc in this specification are values obtained by performing measurement in evaluation areas each having an area of 1000 µm×1000 in a certain region with a KEYENCE VK-X160 laser microscope. Specifically, a certain region of 2 cm×2 cm is first determined, measurement is then performed in at least 20 evaluation areas, each of which is 1000 µm×1000 µm, in this region. The measured values are averaged.

As described above, an arithmetic mean roughness Sa of 0.8 µm or greater and 10.0 µm or less provides a proper peak-to-valley depth on the surface of the molded product, causing the filler 3 to become difficult to see. In addition, a peak arithmetic mean curvature Spc of 400 [1/mm] or greater and 900 [1/mm] or less provides enhanced glossiness, causing the filler fibers slightly exposed at the surface to become more difficult to see. Additionally, such a peak arithmetic mean curvature indicates that, in transferring the shape of a mold to resin to be a molded product, valleys of irregularities of the mold to be transferred as ridges of the molded resin product have a wide, gently-sloping shape. This shape enables the resin to easily flow into the valleys, thus achieving uniform transfer and reducing or eliminating appearance unevenness due to non-uniform transfer.

Consequently, the molded product having a good appearance with no or little filler floating and no or little appearance unevenness can be provided without coating.

Method of Manufacturing Resin Molded Product

A method of manufacturing the resin molded product according to the present disclosure will now be described.

The resin molded product according to the present disclosure is manufactured by injecting resin into a cavity of a mold and transferring irregularities arranged in the cavity to the resin. To transfer the irregularities in the cavity of the mold to the resin, a typical molding process (e.g., injection molding) can be used.

For example, it is necessary to form the irregularities in the surface of the cavity of the mold. The irregularities are to be transferred to resin and provide irregularities in the resin molded product according to the present disclosure. A shape that provides an arithmetic mean roughness Sa of 0.8 µm or greater and 10.0 µm or less and an arithmetic mean curvature Spc of 400 [1/mm] or greater and 900 [1/mm] or less when transferred is modeled using a computer-aided design (CAD) system. During modeling, a repeated pattern is added to the shape to be modeled. The repeated pattern can be added under machining conditions, instead of adding the pattern during modeling using the CAD system. The repeated pattern can be ripples with a pitch of 60 µm or less. Such a pitch value provides narrow intervals between the ripples to make the appearance have uniform glossiness, thus stably providing a molded product having a good appearance with no or little filler floating and no or little appearance unevenness. Modeling with the CAD system enables copying of a mold cavity having the same irregularities, thus improving reproducibility and mass-productiveness. The modeled shape is used to generate numerical control (NC) data for machining of a workpiece into the modeled shape by using a computer-aided manufacturing (CAM) system. The generated NC data is input to machining equipment, in which the surface of a mold cavity is machined.

Figure 5:
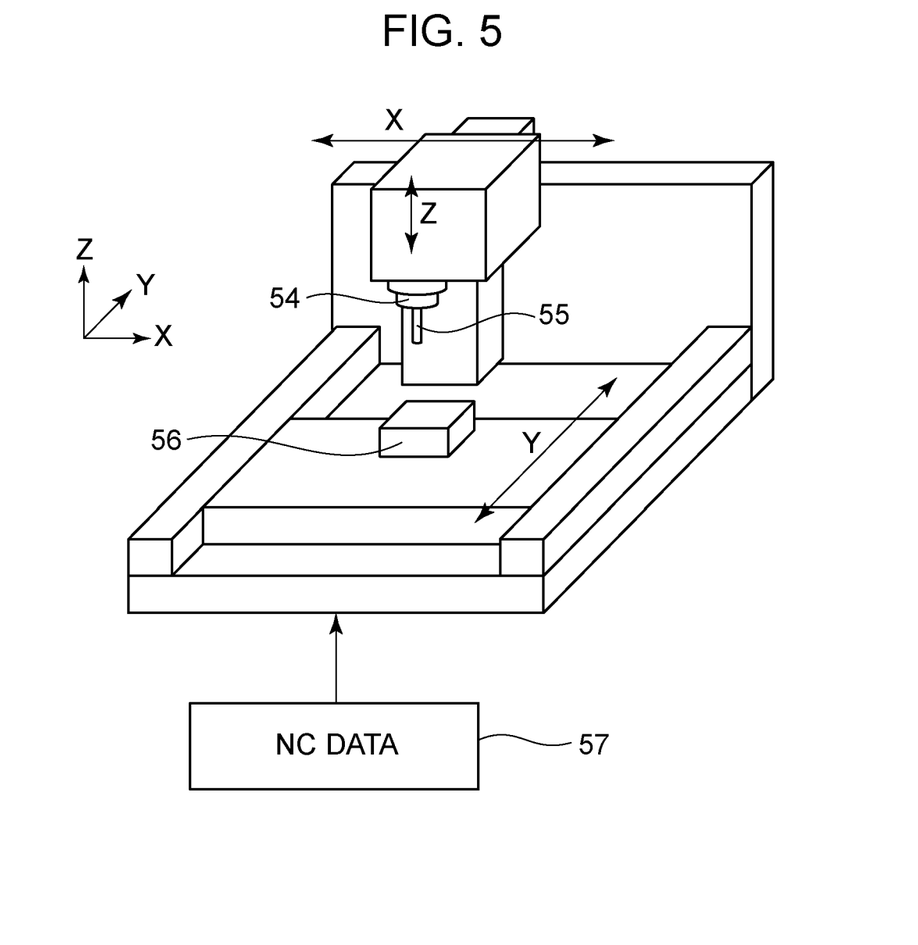
FIG. 5 is a diagram illustrating an exemplary configuration of a machining center.

FIG. 5 is a diagram illustrating an exemplary configuration of a machining center, serving as an example of a machine for machining the surface of a mold cavity. The machining center has three axes: the axis X, the axis Y, and the axis Z. The machining center includes a main shaft 54, to which a tool is attached and which is rotated to allow the attached tool to cut, and a cutting tool 55. A workpiece 56 to be a mold is placed in the machining center. NC data 57 includes instructions for cutting, for example, amounts of movement along the X axis, amounts of movement along the Y axis, amounts of movement along the Z axis, the number of rotations of the main shaft 54, a moving speed along the X axis, a moving speed along the Y axis, and a moving speed along the Z axis. The main shaft 54 is moved and rotated based on the NC data 57 indicating the number of rotations, the moving speed along each axis, and the amounts of movement, thus allowing the cutting tool 55 to cut the workpiece 56 to be a mold. While the main shaft 54 of the machining center is rotated, the cutting tool 55 attached to the main shaft 54 is moved relative to the workpiece 56 to be a mold, thus machining the workpiece into any three-dimensional shape. Non-limiting examples of the cutting tool 55 include a ball end mill having an arc-shaped tip.

Figure 6:
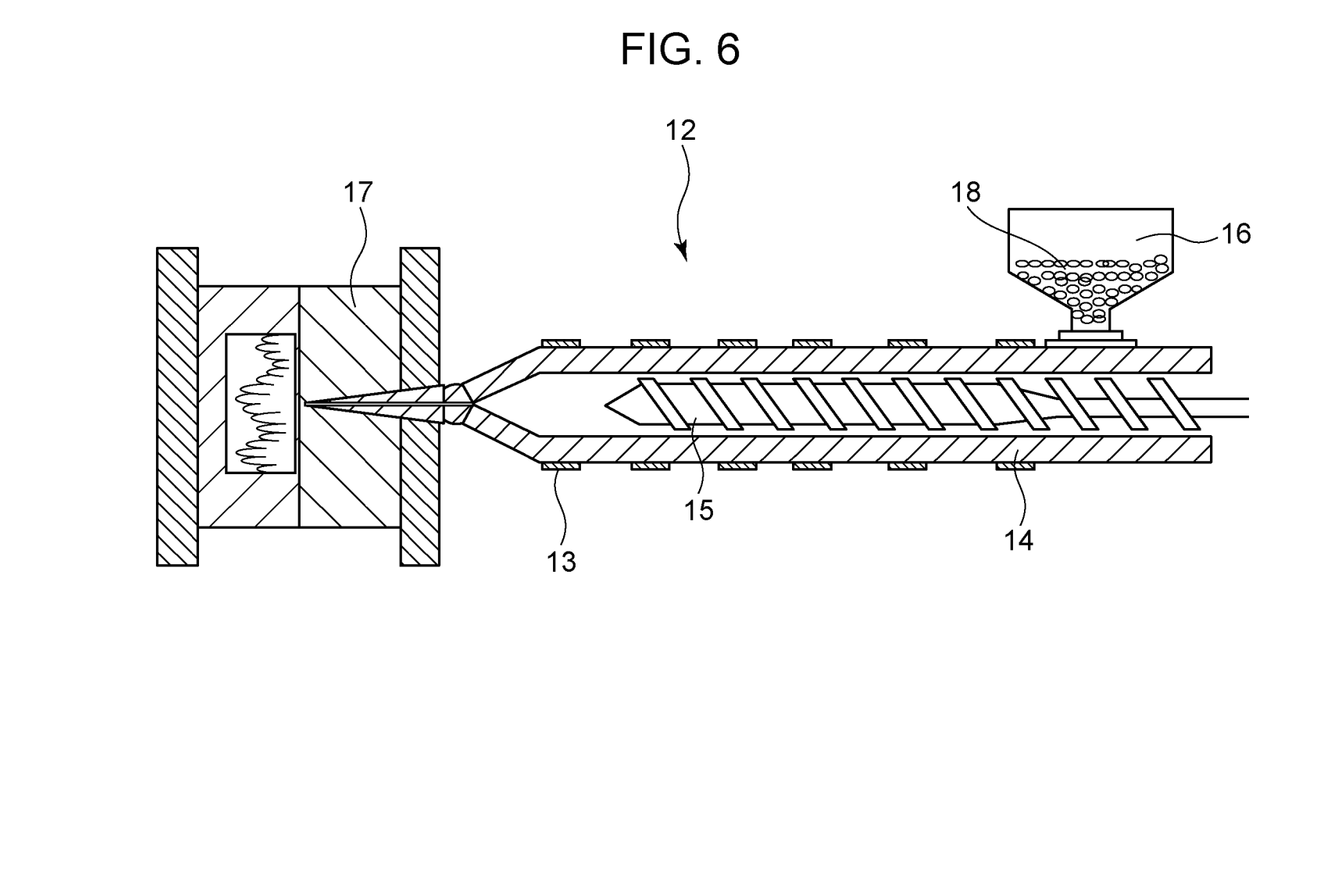
FIG. 6 is a diagram explaining an injection molding method.

Resin is injected into the cavity of the mold machined in the above-described manner and the irregularities in the cavity are transferred to the resin to manufacture the resin molded product according to the present disclosure. To transfer the irregularities in the cavity of the mold to the resin, a typical molding process (e.g., injection molding) can be used. FIG. 6 is a diagram explaining an injection molding process. An injection molding machine 12 is used for injection molding. The injection molding machine 12 includes a heater 13, a heating cylinder 14, a screw 15, and a hopper 16, which constitute an injection unit. The injection molding machine 12 further includes a platen (not illustrated) to which a mold 17 with a cavity having a surface machined in the above-described manner is attached. Resin pellets 18 supplied to the hopper 16 are heated and melted by the injection unit. The resin is injected into the mold 17 such that the mold 17 is filled with the resin, thus transferring the surface texture of the cavity of the mold to the resin.

The resin usable may be any thermoplastic resin containing a filler. In particular, polycarbonate (PC) can be suitably used because it exhibits good environmental resistance, good rigidity, good strength, and good formability.

Examples of the filler 3 usable include an inorganic filler and an organic filler. For example, a glass filler can be used. Furthermore, a mixture of fillers having diameters from several micrometers to several tens of micrometers and lengths from several tens of micrometers to several hundred micrometers is often used in view of low shrinkage and low anisotropy. Specifically, a mixture of fillers having diameters of 1 µm or greater and 90 µm or less and lengths of 10 µm or greater and 900 µm or less is often used. Any of the above-described fillers and filler mixture can be suitably used.

The proportion of the filler to the thermoplastic resin in the filler-containing thermoplastic resin may be 5 parts by weight or greater and 40 parts by weight or less per 100 parts by weight of the thermoplastic resin.

Second Embodiment

Figure 7:
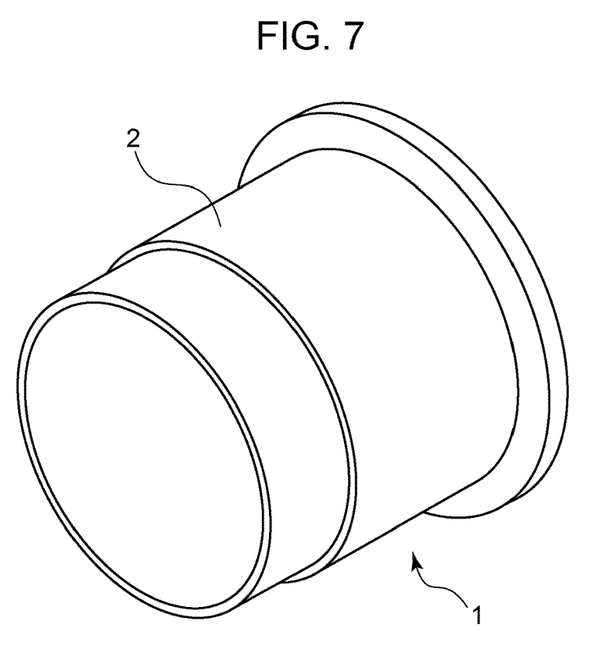
FIG. 7 is a schematic diagram illustrating an exemplary resin molded product according to a second embodiment.
Figure 8:
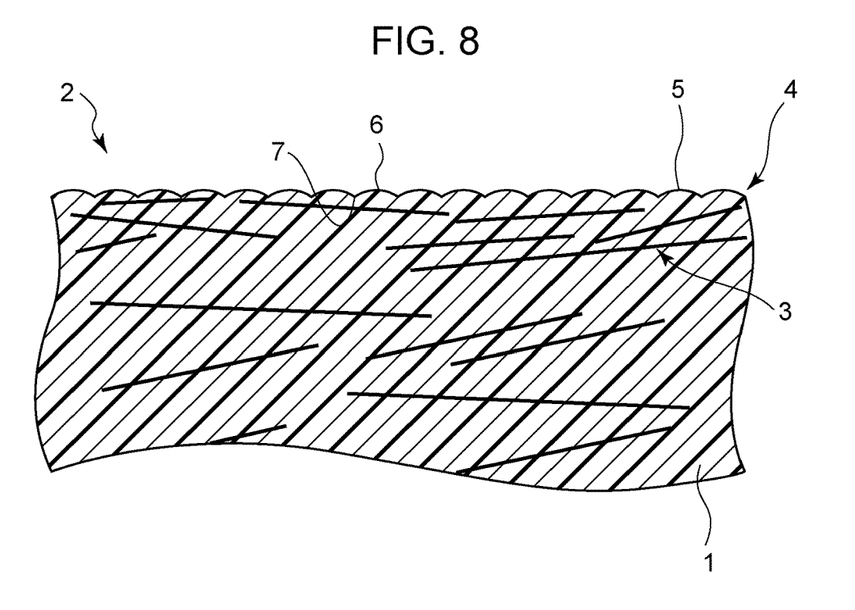
FIG. 8 is a sectional view of surface irregularities of an appearance surface of a thermoplastic resin molded product.

FIG. 7 is a schematic diagram of an exemplary resin molded product according to a second embodiment of the present disclosure and illustrates the resin molded product used as a lens barrel of an interchangeable lens for a camera. FIG. 8 is a sectional view of part of surface irregularities of an appearance surface of the resin molded product illustrated in FIG. 7. In FIGS. 7 and 8, parts having the same functions as those in FIGS. 1 and 2 are designated by the same reference numerals and a detailed description of these parts is omitted. In the second embodiment, differences from the first embodiment will mainly be described.

In the second embodiment, irregularities 4 have such a shape that the arithmetic mean roughness Sa is 0.8 µm or greater and 10 µm or less and a root mean square gradient Sdq is 0.3 or greater and 0.65 or less. This shape eliminates filler floating under conditions without coating, thus providing a resin molded product 1 having a good appearance in which the 60° glossiness defined in Japanese Industrial Standards (JIS) Z 8741 is 11 or greater and less than 60.

As described in the first embodiment, an arithmetic mean roughness Sa less than 0.8 µm indicates that height components of irregularities in the surface of a molded product are very small and filler fibers 3 distributed in the vicinity of valleys 7 are located at a shallow depth relative to protrusions of the irregularities. The filler fibers 3 used for the resin molded product 1, according to the present disclosure, typically have a diameter from several micrometers to several tens of micrometers. When the arithmetic mean roughness Sa is small, the filler 3 tends to be visually recognized, that is, the resin molded product tends to have an appearance defect called filler floating.

In contrast, an arithmetic mean roughness Sa greater than 10.0 µm indicates that irregularities are too deep. Deep irregularities may cause poor mold release when a molded product is released from a mold, causing deformation of the irregularities or whitening due to abrasion of the surface of the molded product. It may be difficult to provide a molded product having a good appearance. Furthermore, if a draft angle necessary for a molded product is increased and the shape of the molded product is restricted in dimensions or if high dimensional accuracy is required because of complexity in shape, it may be difficult to meet the restriction or the dimensional accuracy requirement.

For the above-described reason, although the filler 3 is less likely to be visually recognized as the arithmetic mean roughness Sa is greater, it is difficult to permit irregularities to have a height component greater than 10.0 µm. The height components may range from 0.8 µm to 10.0 µm.

Furthermore, in the second embodiment, the irregularities have such a shape that the root mean square gradient Sdq is 0.3 or greater and 0.65 or less. This shape can enhance glossiness without coating.

In order to enhance the glossiness of a molded product, it is necessary to increase the amount of light reflected to the eyes of a person looking at the molded product. The root mean square gradient Sdq of surface irregularities is designed so as to be within a proper range. Increasing or reducing fine asperities on the surface irregularities to the proper range can reduce diffuse reflection to increase the amount of light. The root mean square gradient Sdq, which is a parameter indicating the extension of a root mean square slope Rdq on a roughness profile to a surface, is defined in ISO 25178.

Figure 9:
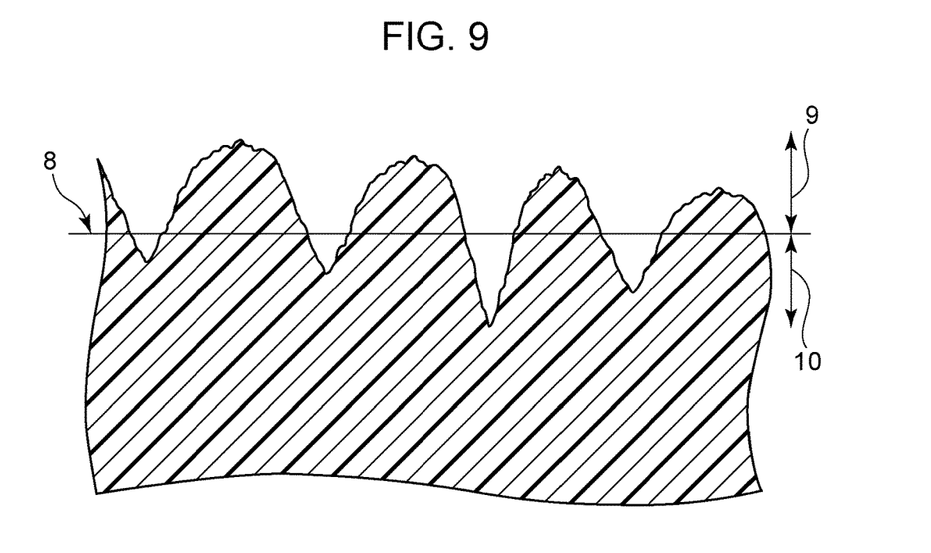
FIG. 9 is a sectional view of surface irregularities for explanation of an arithmetic mean roughness.
Figure 10:
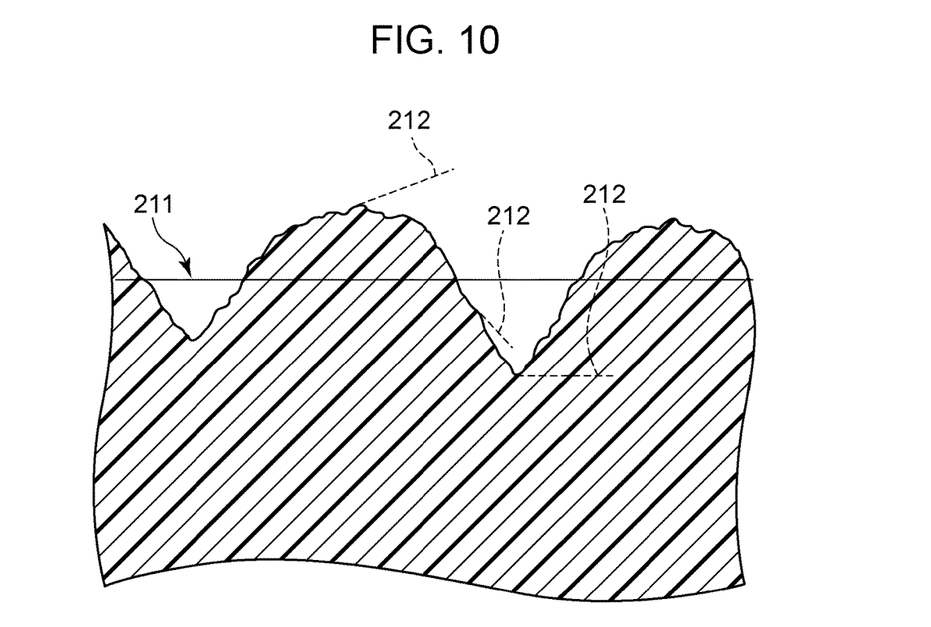
FIG. 10 is a sectional view of surface irregularities for explanation of a root mean square gradient associated with a roughness profile.

The root mean square gradient Sdq represents the mean of slopes on a surface. FIG. 9 is a sectional view of surface irregularities for explanation of the root mean square gradient Sdq. The root mean square gradient Sdq is given by Expression 3.

$$Sdq = \sqrt{\frac{1}{A} \int \int_A \left[\left(\frac{\partial z(x,y)}{\partial x}\right)^2 + \left(\frac{\partial z(x,y)}{\partial y}\right)^2\right] dxdy} \quad (3)$$

where z denotes the height components in the x and y directions and A denotes the area of a measurement region, which is the extension of a reference length 211 (refer to FIG. 10) in the x and y directions. Calculating the square roots of local slopes 212 in the x and y directions of the surface irregularities in FIG. 10 obtains the root mean square gradient Sdq representing the mean of slopes on a surface. A small root mean square gradient Sdq indicates that the surface has many gentle slopes, whereas a large root mean square gradient Sdq indicates that the surface has many steep slopes.

A root mean square gradient Sdq greater than 0.65 indicates that the surface irregularities include many steep slopes. Such a shape tends to cause diffuse reflection of light impinged on the surface of a molded product, leading to a reduction in amount of light reflected to the eyes of a person looking at the molded product. The glossiness of the surface of the molded product would seem to be reduced or lost. The molded product would fail to have a 60° glossiness of 11 or greater and less than 60.

In contrast, a root mean square gradient Sdq less than 0.3 indicates that the surface irregularities significantly reflect light and the 60° glossiness is 60 or greater. Such an appearance state looks like a specular surface. This results in a significant change in appearance state visually observed. It is therefore difficult to reduce the root mean square gradient Sdq to a value less than 0.3.

As described above, an arithmetic mean roughness Sa of 0.8 µm or greater and 10.0 µm or less provides a proper peak-to-valley depth on the surface of the molded product. This proper depth reduces a likelihood that the filler fibers 3 may be visually recognized. In addition, a root mean square gradient Sdq of 0.3 or greater and 0.65 or less provides a 60° glossiness of 11 or greater and less than 60, achieving necessary glossiness.

Consequently, the degree of filler floating is reduced to a level at which filler floating is not visually recognized. The molded product having a good appearance with good glossiness can be provided without coating.

For the root mean square gradient Sdq, the above-described relationship does not apply to a molded product with a coating. The relationship applies only to the surface of a molded product with no coating. The reason is that the principle of glossiness generation on an appearance surface with no coating differs from that on a coated appearance surface because materials on their outermost surfaces differ from each other.

Although the second embodiment has been described above, the texture can satisfy both the conditions in the first embodiment and those in the second embodiment. Specifically, the irregularities can have an arithmetic mean roughness Sa of 0.8 µm or greater and 10 µm or less, a peak arithmetic mean curvature Spc of 400 [1/mm] or greater and 900 [1/mm] or less, and a root mean square gradient Sdq of 0.3 or greater and 0.65 or less.

Examples of the present disclosure will now be described.

EXAMPLES

Examples 1, 2, and 3

In Examples 1, 2, and 3, resin molded products (lens barrels of an interchangeable lens for a camera) described in the first embodiment were made and their appearances were evaluated.

Method of Machining Surfaces of Cavities of Molds

A plurality of designs were created to provide irregularities having different arithmetic mean roughnesses Sa and different peak arithmetic mean curvatures Spc. NC data items for machining of the different designs were generated and the NC data items were input to the machining center. The surfaces of cavities of molds were machined using the ball end mill to form the irregularities.

Injection molding was performed using the molds with the machined cavities such that the irregularities in each cavity were transferred to a resin material to be a molded product, thus obtaining the lens barrels of an interchangeable lens for a camera. The resin material used was polycarbonate (PC) (Iupilon manufactured by Mitsubishi Engineering-Plastics Corporation) containing about 30% glass filler. The molding machine used was J180 EL III Molding Machine (manufactured by Japan Steel Works, Ltd.). Molding conditions were set to achieve adequate transfer of the irregularities in the surfaces of the cavities of the molds.

Evaluation Items and Evaluation Method

Irregularities of resin molded products obtained by injection molding were evaluated using the laser microscope (VK-X160 manufactured by KEYENCE CORPORATION). The surface texture of each of the products was measured at a magnification of 400 times, a certain region including measurement areas each having an area of 1000 µm×1000 µm was defined in a measurement image, and the surface texture in this region was measured. Specifically, evaluation was made based on three items, the arithmetic mean roughness Sa, the peak arithmetic mean curvature Spc, and the pitch of ripples to examine the influence of the surface irregularities on the appearance of the resin molded product.

The appearances of the resin molded products were visually evaluated. Note that a product on which appearance unevenness, a significant change in glossiness, filler floating, and whitening were not visually recognized was determined to have a good appearance (A), a product whose appearance was not poor but fair was determined to have an acceptable appearance (B), and a product having any appearance defect was determined to be poor or unacceptable (C).

Experimental Results

Table 1 lists the arithmetic mean roughnesses Sa, the peak arithmetic mean curvatures Spc, and the visually evaluated appearances of resin molded products formed using the machined cavities having irregularities designed such that the pitch of ripples was 20 µm. It was found that resin molded products of Examples 1-1 to 1-9 had a good appearance surface. This finding indicates that the surface irregularities having an arithmetic mean roughness Sa of 0.8 µm or greater and 10.0 µm or less and a peak arithmetic mean curvature Spc of 400 [1/mm] or greater and 900 [1/mm] or less provide a good appearance surface with, for example, no or little appearance unevenness and no or little filler floating.

Resin molded products of Comparative Examples 1 to 6 had a poor appearance.

In Comparative Examples 1 and 2, the peak arithmetic mean curvatures Spc were less than 400 [1/mm]. The surface irregularities caused intense reflection of light, resulting in a significant change in appearance state visually observed. The appearances were determined to be poor or unacceptable.

In Comparative Examples 3 and 4, the irregularities were too deep. Poor mold release and deformation of the irregularities were observed. If a necessary draft angle is increased and the shape of a molded product is restricted in dimensions or if high dimensional accuracy is required because of complexity in shape, it may be difficult to meet the restriction or the dimensional accuracy requirement. In view of these circumstances, the appearances of the products of Comparative Examples 3 and 4 were determined to be unacceptable.

Table 2 lists evaluated appearances of resin molded products formed using the machined cavities having irregularities designed such that the pitch of ripples was 60 µm. Table 3 lists evaluated appearances of resin molded products formed using cavities having irregularities designed such that the pitch of ripples was 100 µm. The resin molded products designed such that the pitch of ripples was 60 µm had a good appearance, which is not significantly different from that in the case where the pitch was 20 µm. In each of the resin molded products designed such that the pitch was 100 µm, however, the widened pitch increased the influence of each ripple on the appearance. Slight appearance unevenness caused by variations in glossiness in the ripples was observed.

TABLE 1

| | EVALUATION ITEMS | | |
|---|---|---|---|
| | ARITHMETIC MEAN ROUGHNESS [µm] | PEAK ARITHMETIC MEAN CURVATURE [1/mm] | APPEARANCE |
| EXAMPLE 1-1 | 1.03 | 405 | A |
| EXAMPLE 1-2 | 1.2 | 620 | A |
| EXAMPLE 1-3 | 1.16 | 790 | A |
| EXAMPLE 1-4 | 5.15 | 416 | A |
| EXAMPLE 1-5 | 4.86 | 586 | A |
| EXAMPLE 1-6 | 4.99 | 786 | A |
| EXAMPLE 1-7 | 9.45 | 450 | A |
| EXAMPLE 1-8 | 9.36 | 640 | A |
| EXAMPLE 1-9 | 9.82 | 788 | A |
| COMPARATIVE EXAMPLE 1 | 0.988 | 387 | C |
| COMPARATIVE EXAMPLE 2 | 1.08 | 370 | C |
| COMPARATIVE EXAMPLE 3 | 10.82 | 856 | C |
| COMPARATIVE EXAMPLE 4 | 10.23 | 782 | C |

TABLE 2

| | EVALUATION ITEMS | | |
|---|---|---|---|
| | ARITHMETIC MEAN ROUGHNESS [µm] | PEAK ARITHMETIC MEAN CURVATURE [1/mm] | APPEARANCE |
| EXAMPLE 2-1 | 1.08 | 418 | A |
| EXAMPLE 2-2 | 1.15 | 567 | A |
| EXAMPLE 2-3 | 1.26 | 792 | A |
| EXAMPLE 2-4 | 4.51 | 450 | A |
| EXAMPLE 2-5 | 4.92 | 620 | A |
| EXAMPLE 2-6 | 5.84 | 748 | A |
| EXAMPLE 2-7 | 9.72 | 416 | A |
| EXAMPLE 2-8 | 9.54 | 526 | A |
| EXAMPLE 2-9 | 9.84 | 792 | A |

TABLE 3

| | EVALUATION ITEMS | | |
|---|---|---|---|
| | ARITHMETIC MEAN ROUGHNESS [μm] | PEAK ARITHMETIC MEAN CURVATURE [1/mm] | APPEARANCE |
| EXAMPLE 3-1 | 1.05 | 412 | B |
| EXAMPLE 3-2 | 1.52 | 601 | B |
| EXAMPLE 3-3 | 1.16 | 786 | B |
| EXAMPLE 3-4 | 5.1 | 751 | B |
| EXAMPLE 3-5 | 4.87 | 791 | B |
| EXAMPLE 3-6 | 5.62 | 745 | B |
| EXAMPLE 3-7 | 9.72 | 776 | B |
| EXAMPLE 3-8 | 9.8 | 792 | B |
| EXAMPLE 3-9 | 9.85 | 783 | B |

Examples 4, 5, and 6

In Examples 4, 5, and 6, resin molded products (lens barrels of an interchangeable lens for a camera) described in the second embodiment were made and their appearances were evaluated.

Method of Machining Surfaces of Cavities of Molds

A plurality of designs were created to provide irregularities having different arithmetic mean roughnesses Sa and different root mean square gradients Sdq. NC data items for machining of the different designs were generated and the NC data items were input to the machining center. The surfaces of cavities of molds were machined using the ball end mill to form the irregularities.

Injection molding was performed using the molds with the machined cavities such that the irregularities in each cavity were transferred to a resin material to be a molded product, thus obtaining the lens barrels of an interchangeable lens for a camera. The resin material used was polycarbonate (PC) (Iupilon manufactured by Mitsubishi Engineering-Plastics Corporation) containing about 30% glass filler. The molding machine used was J180 EL III Molding Machine (manufactured by Japan Steel Works, Ltd.). Molding conditions were set to achieve adequate transfer of the irregularities in the surfaces of the cavities of the molds.

Evaluation Items and Evaluation Method

Irregularities of resin molded products obtained by injection molding were evaluated using the laser microscope (VK-X160 manufactured by KEYENCE CORPORATION). The surface texture of each of the products was measured at a magnification of 400 times, a certain region including evaluation areas each having an area of 1000 μm×1000 μm was defined in a measurement image, and the surface texture in this region was measured. Specifically, evaluation was made based on three items, the arithmetic mean roughness Sa, the root mean square gradient Sdq, and the pitch of ripples to examine the influence of the surface irregularities on the appearance of the resin molded product.

The appearances of the resin molded products were visually evaluated. Note that a product on which appearance unevenness, a significant change in glossiness, filler floating, and whitening were not visually recognized was determined to have a good appearance (A), a product whose appearance was not poor but fair was determined to have an acceptable appearance (B), and a product having any appearance defect was determined to be poor or unacceptable (C).

Experimental Results

Table 4 lists the arithmetic mean roughnesses Sa, the root mean square gradients Sdq of resin molded products obtained using the machined cavities having irregularities designed such that the pitch of ripples was 20 μm. Table 4 further illustrates visual evaluation results of filler floating, glossiness, and other appearance defects of the resin molded products. It was found that the resin molded products of Examples 4-1 to 4-9 had a good appearance surface with no or little filler floating and with good glossiness. This finding indicates that the surface irregularities having an arithmetic mean roughness Sa of 0.8 μm or greater and 10.0 μm or less and a root mean square gradient Sdq of 0.3 or greater and 0.65 or less provide a good appearance surface with necessary glossiness and with no or little filler floating.

The resin molded products of Comparative Examples 5 to 9 had a poor appearance.

In Comparative Examples 5 and 6, the root mean square gradients Sdq were less than 0.3. The surface irregularities caused intense reflection of light, resulting in a significant change in appearance state visually observed. In addition, the resin molded products had excessive glossiness. These resin molded products were accordingly determined to be unacceptable.

In Comparative Examples 7 and 9, the root mean square gradients Sdq exceeded 0.65. The surface irregularities tended to cause diffuse reflection of light, resulting in a significant reduction in glossiness. The surfaces of the resin molded products did not have necessary glossiness. The molded products were accordingly determined to be unacceptable.

In Comparative Examples 7 and 8, the irregularities were too deep. Poor mold release and deformation of the irregularities were observed. If a necessary draft angle is increased and the shape of a molded product is restricted in dimensions or if high dimensional accuracy is required because of complexity in shape, it may be difficult to meet the restriction or the dimensional accuracy requirement. In view of these circumstances, the products of Comparative Examples 7 and 8 were determined to be unacceptable.

Table 5 lists arithmetic mean roughnesses Sa and root mean square gradients Sdq of resin molded products obtained using the machined cavities having irregularities designed such that the pitch of ripples was 60 μm. Table 6 lists arithmetic mean roughnesses Sa and root mean square gradients Sdq of resin molded products obtained using the machined cavities having irregularities designed such that the pitch of ripples was 100 μm. Tables 5 and 6 further illustrate visual evaluation results of filler floating, glossiness, and other appearance defects of the resin molded products. The resin molded products designed such that the pitch of ripples was 60 μm had a good appearance, which is not significantly different from that in the case where the pitch was 20 μm. In each of the resin molded products designed such that the pitch was 100 μm, however, the widened pitch increased the influence of each ripple on the appearance. Slight appearance unevenness caused by variations in glossiness in the ripples was observed.

TABLE 4

| | EVALUATION ITEMS | | | | |
|---|---|---|---|---|---|
| | ARITHMETIC MEAN ROUGHNESS [μm] | ROOT MEAN SQUARE GRADIENT | FILLER FLOATING | GLOSSINESS | OTHER DEFECTS |
| EXAMPLE 4-1 | 1.04 | 0.318 | A | A | A |
| EXAMPLE 4-2 | 1.21 | 0.455 | A | A | A |
| EXAMPLE 4-3 | 1.15 | 0.648 | A | A | A |
| EXAMPLE 4-4 | 5.15 | 0.306 | A | A | A |
| EXAMPLE 4-5 | 4.86 | 0.442 | A | A | A |
| EXAMPLE 4-6 | 5.26 | 0.64 | A | A | A |
| EXAMPLE 4-7 | 9.82 | 0.326 | A | A | A |
| EXAMPLE 4-8 | 9.98 | 0.485 | A | A | A |
| EXAMPLE 4-9 | 9.45 | 0.628 | A | A | A |
| COMPARATIVE EXAMPLE 5 | 0.982 | 0.285 | A | C | A |
| COMPARATIVE EXAMPLE 6 | 1.024 | 0.279 | A | C | A |
| COMPARATIVE EXAMPLE 7 | 10.24 | 0.668 | C | C | C |
| COMPARATIVE EXAMPLE 8 | 10.52 | 0.638 | C | A | C |
| COMPARATIVE EXAMPLE 9 | 9.88 | 0.68 | A | C | A |

TABLE 5

| | EVALUATION ITEMS | | | | |
|---|---|---|---|---|---|
| | ARITHMETIC MEAN ROUGHNESS [μm] | ROOT MEAN SQUARE GRADIENT | FILLER FLOATING | GLOSSINESS | OTHER DEFECTS |
| EXAMPLE 5-1 | 1.09 | 0.312 | A | A | A |
| EXAMPLE 5-2 | 1.34 | 0.452 | A | A | A |
| EXAMPLE 5-3 | 1.24 | 0.634 | A | A | A |
| EXAMPLE 5-4 | 4.58 | 0.301 | A | A | A |
| EXAMPLE 5-5 | 4.86 | 0.426 | A | A | A |
| EXAMPLE 5-6 | 4.75 | 0.648 | A | A | A |
| EXAMPLE 5-7 | 9.45 | 0.345 | A | A | A |
| EXAMPLE 5-8 | 9.52 | 0.52 | A | A | A |
| EXAMPLE 5-9 | 9.85 | 0.629 | A | A | A |

TABLE 6

| | EVALUATION ITEMS | | | | |
|---|---|---|---|---|---|
| | ARITHMETIC MEAN ROUGHNESS [μm] | ROOT MEAN SQUARE GRADIENT | FILLER FLOATING | GLOSSINESS | OTHER DEFECTS |
| EXAMPLE 6-1 | 1.01 | 0.309 | B | B | B |
| EXAMPLE 6-2 | 4.42 | 0.482 | B | B | B |
| EXAMPLE 6-3 | 1.26 | 0.638 | B | B | B |
| EXAMPLE 6-4 | 4.56 | 0.318 | B | B | B |
| EXAMPLE 6-5 | 482 | 0.542 | B | B | B |
| EXAMPLE 6-6 | 4.68 | 0.637 | B | B | B |
| EXAMPLE 6-7 | 9.62 | 0.328 | B | B | B |
| EXAMPLE 6-8 | 9.78 | 0.439 | B | B | B |
| EXAMPLE 6-9 | 9.91 | 0.638 | B | B | B |

Examples 7 and 8

In Examples 7 and 8, resin molded products (lens barrels of an interchangeable lens for a camera) described in the first and second embodiments were made. Their iridescent appearances caused by interference of light resulting from irregularities of the molded products were evaluated in addition to the appearances with respect to filler floating and appearance unevenness. The term "iridescent appearance" as used herein refers to an appearance defect indicating that the surface of a molded product seems to have an iridescent surface depending on, for example, differences in optical path length caused by irregularities of the molded product or a light reflected state, that is, the ratio of regular reflection to irregular reflection (diffuse reflection).

Method of Machining Surfaces of Cavities of Molds

A plurality of designs were created to provide irregularities having different arithmetic mean roughnesses Sa, different peak arithmetic mean curvatures Spc, and different root mean square gradients Sdq. NC data items for machining of the different designs were generated and the NC data items were input to the machining center. The surfaces of cavities of molds were machined using the ball end mill to form the irregularities.

Injection molding was performed using the molds with the machined cavities such that the irregularities in each cavity were transferred to a resin material to be a molded product, thus obtaining the lens barrels of an interchangeable lens for a camera. The resin material used was polycarbonate (PC) (Iupilon manufactured by Mitsubishi Engineering-Plastics Corporation) containing about 30% glass filler. The molding machine used was J180 EL III Molding Machine (manufactured by Japan Steel Works, Ltd.). Molding conditions were set to achieve adequate transfer of the irregularities in the surfaces of the cavities of the molds.

Evaluation Items and Evaluation Method

Irregularities of resin molded products obtained by injection molding were evaluated using the laser microscope (VK-X160 manufactured by KEYENCE CORPORATION). The surface texture of each of the products was measured at a magnification of 400 times, a certain region including evaluation areas each having an area of 1000 μm×1000 μm was defined in a measurement image, and the surface texture in this region was measured. Specifically, evaluation was made based on the arithmetic mean roughness Sa, the peak arithmetic mean curvature Spc, and the root mean square gradient Sdq to examine the influence of the surface irregularities on the appearance of the resin molded product.

The appearances of the resin molded products were visually evaluated with respect to iridescent appearance and other appearance defects including filler floating and appearance unevenness. Note that a product on which any appearance defects were not visually recognized was determined to have a good appearance (A), a product whose appearance was not poor but fair was determined to have an acceptable appearance (B), and a product on which any appearance defect was visually recognized was determined to be poor or unacceptable (C).

Experimental Results

Tables 7 and 8 list the evaluation results of the appearances of the molded products having the irregularities with the different peak arithmetic mean curvatures Spc, the different root mean square gradients Sdq, and the different arithmetic mean roughnesses Sa that lie in a range where filler floating does not tend to occur, as demonstrated in Examples 1 and 2, and that lie in a lower limit range from 0.8 to 1.2 μm where diffuse reflection does not tend to occur and an iridescent pattern can be easily visually recognized. The resin molded products of Examples 7-1 to 7-3 had a good appearance in which any appearance defect was not visually recognized. The resin molded product of Example 7-4 was slightly inferior only in iridescent appearance to the products of Examples 7-1 to 7-3 but the degree of the iridescent appearance did not reach a defective level. Similarly, the resin molded products of Examples 8-1 to 8-3 had a good appearance in which any appearance defect was not visually recognized. The resin molded product of Example 8-4 was slightly inferior only in iridescent appearance to the products of Examples 8-1 to 8-3 but the degree of the iridescent appearance did not reach a defective level. This finding indicates that any of the appearance defects including an iridescent pattern was not visually recognized in the surface irregularities having an arithmetic mean curvature Spc of 450 [1/mm] or greater and 900 [1/mm] or less or having a root mean square gradient Sdq of 0.4 or greater and 0.65 or less and these irregularities can provide a high-quality appearance surface.

In Comparative Example 10, the peak arithmetic mean curvature Spc was less than 380 [1/mm]. In Comparative Example 11, the root mean square gradient Sdq was less than 0.3. These resin molded products hardly caused diffuse reflection. Consequently, the amount of light reflected to the eyes of a person viewing these resin molded products was increased. It is conceivable that the visually observed appearances of the molded products significantly changed and their iridescent patterns were clearly seen and visually recognized as appearance defects.

TABLE 7

| | EVALUATION ITEMS | | | |
|---|---|---|---|---|
| | ARITHMETIC MEAN ROUGHNESS [μm] | PEAK ARITHMETIC MEAN CURVATURE [1/mm] | OTHER DEFECTS | IRIDESCENT APPEARANCE |
| EXAMPLE 7-1 | 0.943 | 452 | A | A |
| EXAMPLE 7-2 | 1.065 | 624 | A | A |
| EXAMPLE 7-3 | 0.911 | 848 | A | A |
| EXAMPLE 7-4 | 1.022 | 431 | A | B |
| COMPARATIVE EXAMPLE 10 | 1.119 | 377 | C | C |

TABLE 8

| | EVALUATION ITEMS | | | |
|---|---|---|---|---|
| | ARITHMETIC MEAN ROUGHNESS [μm] | ROOT MEAN SQUARE GRADIENT | OTHER DEFECTS | IRIDESCENT APPEARANCE |
| EXAMPLE 8-1 | 0.941 | 0.423 | A | A |
| EXAMPLE 8-2 | 0.949 | 0.562 | A | A |
| EXAMPLE 8-3 | 1.111 | 0.641 | A | A |
| EXAMPLE 8-4 | 1.024 | 0.351 | A | B |
| COMPARATIVE EXAMPLE 11 | 1.054 | 0.298 | C | C |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-098988 filed May 17, 2016 and No. 2017-079189 filed Apr. 12, 2017, which are hereby incorporated by reference herein in their entirety.

What is claimed is:
1. A resin molded product comprising:
a surface formed using a thermoplastic resin,
wherein irregularities are transferred from a mold cavity to the surface and the irregularities are present on the surface of the resin molded product and have an arithmetic mean roughness of 0.8 μm or greater and 10

µm or less and a peak arithmetic mean curvature of 400 (1/mm) or greater and 900 (1/mm) or less.

2. The resin molded product according to claim 1, wherein the peak arithmetic mean curvature is 450 (1/mm) or greater and 900 (1/mm) or less.

3. The resin molded product according to claim 1, wherein the irregularities include a repeated pattern.

4. The resin molded product according to claim 1, wherein the irregularities include ripples with a pitch of 60 µm or less.

5. The resin molded product according to claim 1, wherein the thermoplastic resin includes an inorganic or organic filler.

6. The resin molded product according to claim 1, wherein the thermoplastic resin includes a filler having a diameter of 1 µm or greater and 90 µm or less and a length of 10 µm or greater and 900 µm or less.

7. A resin molded product comprising:
a surface formed using a thermoplastic resin,
wherein irregularities are transferred from a mold cavity to the surface and the irregularities are present on the surface of the resin molded product and have an arithmetic mean roughness of 0.8 µm or greater and 10 µm or less and a root mean square gradient of 0.3 or greater and 0.65 or less wherein the irregularities have a peak arithmetic mean curvature of 400 (1/mm) or greater and 900 (1/mm) or less.

8. The resin molded product according to claim 7, wherein the peak arithmetic mean curvature is 450 (1/mm) or greater and 900 (1/mm) or less.

9. The resin molded product according to claim 7, wherein the root mean square gradient is 0.4 or greater and 0.65 or less.

10. The resin molded product according to claim 7, wherein the irregularities include a repeated pattern.

11. The resin molded product according to claim 7, wherein the irregularities include ripples with a pitch of 60 µm or less.

12. The resin molded product according to claim 7, wherein the thermoplastic resin includes an inorganic or organic filler.

13. The resin molded product according to claim 7, wherein the thermoplastic resin includes a filler having a diameter of 1 µm or greater and 90 µm or less and a length of 10 µm or greater and 900 µm or less.

14. An interchangeable lens for a camera, the lens comprising:
the resin molded product according to claim 1.

15. An interchangeable lens for a camera, the lens comprising:
the resin molded product according to claim 7.

* * * * *